Patented Oct. 11, 1938

2,132,674

UNITED STATES PATENT OFFICE 2,132,674

AROMATIC POLYETHER AMINES

Herman A. Bruson, Philadelphia, Pa., assignor to Röhm & Haas Company, Philadelphia, Pa.

No Drawing. Application July 31, 1936,
Serial No. 93,571

15 Claims. (Cl. 260—574)

This invention relates to condensation products of primary or secondary aromatic amines with aryloxypolyalkylene ether halides, said condensation products having the following formula:

$$R-O-A-(O-A)_n-O-A-\underset{\underset{R}{|}}{N}-R$$

where R signifies an aromatic group of the naphthalene or benzene series, A is an alkylene radical containing at least two carbon atoms, $n$ is one or zero, and X is hydrogen or an alkyl group.

Condensation products of this type can readily be prepared by reacting primary or secondary amines, such as aniline, the toluidines, the xylidines, the naphthylamines, diphenylamine, dinaphthylamine, and N-monoalkyl aromatic amines, such as N-methyl-aniline, N-methyl-naphthylamines, with aryloxypolyalkylene ether halides, such as those having the following formulae:

(a) R—O—CH₂—CH₂—O—CH₂—CH₂Cl
(b) R—O—CH₂—CH—O—CH—CH₂Cl
                     |          |
                     CH₃     CH₃
(c) R—O—CH₂—CH₂—O—CH₂—CH₂—O—CH₂—CH₂Cl
(d) R—O—CH₂—CH₂—O—CH₂—CH₂—O—CH₂—CH₂Cl wherein R is an aromatic group that may contain such substituents as the alkyl, aralkyl, cycloalkyl or nitro groups. Such aryloxypolyalkylene ether halides may be prepared by condensing monohydric phenols or naphthols with dichlorpolyalkylene ethers in the presence of caustic soda in accordance with the process disclosed and claimed in my co-pending application Serial No. 79,718 filed May 14, 1936.

In applications Serial Nos. 82,183 and 82,184 filed May 28, 1936 I show the preparation of additional aryloxypolyalkylene ether halides and their condensation with primary or secondary aliphatic, cycloaliphatic, arylaliphatic and hydroxyaliphatic amines or secondary heterocyclic amines. I have now found that aryloxypolyalkylene ether halides of the above type also react with aromatic primary or secondary amines to form condensation products. The reaction may be carried out by heating an equimolecular mixture of an aryloxypolyalkylene ether halide and an aromatic amine at from 100° to 160° C. for approximately four to sixteen hours. Preferably an excess of amine is used and the reaction carried out under reflux or in a closed vessel at a temperature between 110° and 115° C. for from eight to sixteen hours. An inert organic liquid may be used as a diluent, toluene, xylene or naphthalene being useful for this purpose. An inorganic base such as the carbonate or hydroxide of an alkali or an alkaline earth metal may be used to bind the hydrogenhalide formed.

In order to illustrate this invention, the following examples are given, the parts indicated being by weight.

Example 1

C₆H₅—O—CH₂—CH₂—O—CH₂—CH₂—NH—C₆H₅

A mixture consisting of 60 parts aniline and 43 parts β-phenoxy-β'-chlorodiethyl ether was heated under a reflux condenser for eight hours at 105°–110° C. while stirring. Crystals of the hydrochloride of the base formed. The reaction mixture was then made alkaline with 100 parts of 10% caustic soda solution and heated for one-half hour. The oil layer which separated was washed with water, dried, and fractionated under reduced pressure. The product, consisting of β-phenoxy-β'-phenylamino-diethyl ether, distilled over at 204° to 207° C/7 mm. as a pale yellow oil. Yield 55–65% of theory.

By substituting 47 parts of β-phenoxy-β'-chlorodiisopropyl ether for the 43 parts of β-phenoxy-β'-chlorodiethyl ether in the foregoing example an amine having the formula C₆H₅—O—CH₂—CH—O—CH—CH₂—NH—C₆H₅
                    |       |
                   CH₃  CH₃ may be prepared.

Example 2

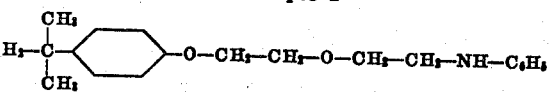

A mixture consisting of 70 parts aniline and 52 parts of p-ter-octylphenoxyethoxyethyl chloride (a colorless oil, B. P. 177° to 178° C/4 mm., obtained by condensing β,β'-dichlorodiethyl ether with p-α,α,γ,γ-tetramethylbutylphenol in the presence of caustic soda) was heated under a reflux condenser for eight hours at 110° to 120° C. The reaction mixture was made alkaline and worked up as in Example 1. The product boiled at 250° to 255° C/6 mm. Yield 65–70% of theory.

Example 3

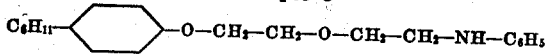

A mixture of 28.2 grams of p-cyclohexylphenoxyethoxyethyl chloride and 18.6 grams aniline was heated at 130° to 140° C. under reflux while constantly agitated for sixteen hours and worked up as in Example 1. The N-p-cyclohexylphenoxy-ethoxyethyl aniline boiled at 271° to 273° C/5 mm. Yield 28 grams.

Example 4

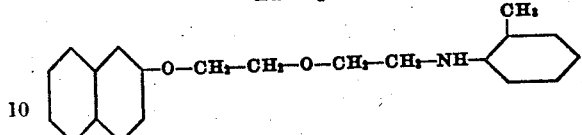

A mixture of 50.1 grams of β(β-naphthoxy) ethoxy-ethyl chloride and 42.8 grams of ortho-toluidine was heated for seven and one-half hours at 130° to 140° C. under reflux and worked up as in Example 1. The N-β(β-naphthoxy)ethoxy-ethyl-o-toluidine boiled at 268° to 271° C/5 mm. Yield 51 grams. It formed a crystalline mass, M. P. 69° C. (from petroleum ether).

Example 5

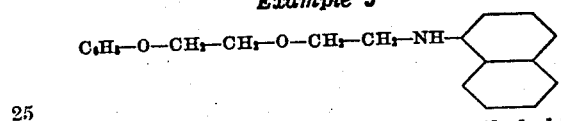

A mixture of 50 grams phenoxyethoxyethyl chloride and 71.5 grams of α-naphthylamine was heated at 140° to 145° C. for 20 hours under reflux, and worked up as in Example 1. The N-phenoxy-ethoxy-ethyl-α-naphthylamine boiled at 270° to 280° C/6 mm. Yield 50 grams.

Example 6

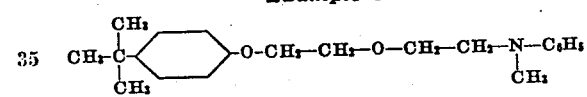

A mixture of 20.7 grams N-methyl aniline and 25.6 grams p-ter-butylphenoxyethoxyethyl chloride was heated under reflux for eight hours at 130° to 140° C. The reaction mixture was boiled with 100 cc. of 10% caustic soda solution for one hour, the oil taken up in ether, and fractionated. The N-p-ter-butylphenoxyethoxyethyl-N-methyl aniline came over at 198° to 201° C/2 mm. as a pale yellow oil. Yield 83% of theory.

Example 7

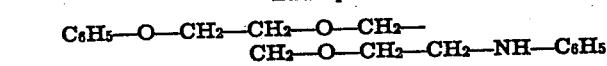

A mixture of 24.4 grams β-phenoxyethoxy-β'-chlorodiethyl ether, C₆H₅—O—CH₂—CH₂—O—CH₂—CH₂—O—CH₂—CH₂Cl, (a liquid boiling at 148° to 151° C/4 mm. and obtainable by condensing phenol with excess β-chloroethoxy-β'-chlorodiethyl ether in the presence of caustic soda), and 18.6 grams aniline was heated eight hours at 130° to 140° C. while stirring. The reaction mixture was made alkaline with hot dilute caustic soda solution, and the oil which separated was fractionated in vacuo. It came over at 238° to 240° C/3 mm. as a pale yellow oil. Yield 27 grams.

Example 8

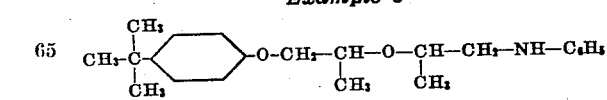

A mixture consisting of 28.4 grams of p-ter-butylphenoxy-isopropoxy-isopropyl chloride and 18.6 grams aniline was heated eight hours at 130° to 140° C. and the reaction mixture made alkaline and worked up as in Example 1. The product distilled at 238° to 244° C/4 mm. as a viscous, reddish oil.

Analogous reactions may be carried out with the following aromatic polyether halides of the type set forth herein, which are also disclosed in my copending applications Serial Nos. 82,183; 82,184 and 79,718, previously referred to, namely:

β-(o-phenylphenoxy)ethyl-β'-chloroethyl ether
β-(p-phenylphenoxy)ethyl-β'-chloroethyl ether
β-thymoxy-β'-chloro-diethyl ether
β-(1,3,5-xylenoxy)-β'-chloro-diethyl ether
β-(p-ter-amylphenoxy)-β'-chloro-diethyl ether
β-(p-ter-butylphenoxyethoxy)-β'-chloro-diethyl ether
β-(p-ter-amylphenoxyethoxy)-β'-chloro-diethyl ether
β-(p-nitrophenoxyethoxy)-β'-chloro-diethyl ether
β-(o-benzylphenoxyethoxy)-β'-chloro-diethyl ether
β-(p-cresyloxyethoxy)-β'-chloro-diethyl ether.

In addition to the foregoing specific compounds other aryloxy polyether halides may be used, such as may be prepared from various phenols and various dihalogeno polyalkylene ethers as set forth in my co-pending application Ser. No. 82,-183 above referred to. Among the phenols suitable for this purpose are phenol, o-, m-, or p-cresol, thymol, carvacrol, p-ter. butyl phenol, p-sec. butyl phenol, p-ter. amyl phenol, p-n-amyl phenol, n-amyl-m-cresol, p-sec. octyl phenol, p-ter. octyl phenol, p-sec. hexyl phenol, lauryl phenol, o-, m-, or p-benzyl phenol, α- or β-naphthol, ter. butyl-β-naphthol, ter. octyl-β-naphthol, 1,3,5-xylenol and their obvious equivalents. Among the dihalogeno polyalkylene ethers suitable for condensation with the above-listed phenols are β-β'-dichlorodiethyl ether, β-β'-dichlorodiisopropyl ether, dichlorodibutyl ether, dichlorodiamyl ether and the corresponding dibromo derivatives, β-chloroethyl-β'-chloroethoxy ethyl ether and their higher homologs containing up to 18 carbon atoms.

The compounds made according to the present invention may be added to rubber, lubricating oils and other autooxidizable materials in order to retard oxidation.

I claim:

1. An aromatic amine having the formula

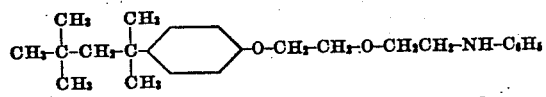

2. An aromatic amine having the formula:

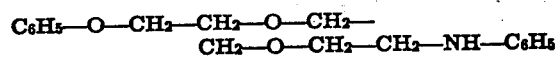

3. An aromatic amine having the formula

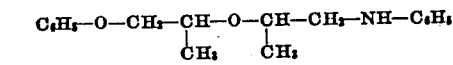

4. An aromatic amine having the general formula

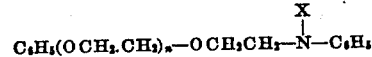

in which $n$ is an integer less than three and X is a member of the group consisting of hydrogen, lower alkyl groups, and aryl groups.

5. An aromatic amine having the general formula

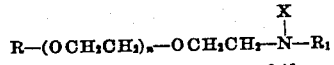

in which R and R₁ are members of the group consisting of phenyl and naphthyl radicals, $n$ is an integer less than three, and X is a member of the group consisting of hydrogen, lower alkyl groups, and aryl groups.

6. A condensation product of an aryloxy polyalkylene ether halide in which the alkylene groups are selected from the lower members of the series and a member of the group consisting of primary and secondary aromatic amines.

7. The process which comprises condensing an aryloxy polyalkylene ether chloride in which the alkylene groups are selected from the lower members of the series with an amine which is a member of the group consisting of primary and secondary aromatic amines.

8. An aromatic amine having the general formula

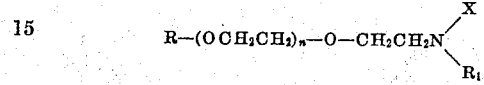

in which R is an aromatic hydrocarbon radical containing a nuclear substituent which is one of the group consisting of alkyl, aralkyl, and cycloalkyl radicals, $R_1$ is an aromatic hydrocarbon radical, $n$ is an integer less than three, and X is a member of the group consisting of hydrogen, lower alkyl groups and aryl groups.

9. An aromatic amine having the general formula

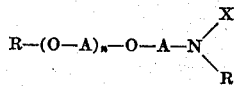

in which A represents lower alkylene radicals containing at least two carbon atoms, R is a hydrocarbon radical containing a nuclear substituent which is a member of the group consisting of alkyl, aralkyl and cycloalkyl radicals, $R_1$ is an aromatic hydrocarbon radical, $n$ is an integer less than three, and X is a member of the group consisting of hydrogen, lower alkyl groups and aryl groups.

10. An aromatic amine having the general formula

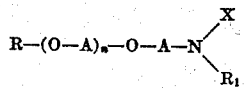

in which A represents lower alkylene radicals containing at least two carbon atoms, R and $R_1$ are aromatic hydrocarbon radicals, $n$ is an integer less than three, and X is a member of the group consisting of hydrogen, lower alkyl groups and aryl groups.

11. A condensation product of an aromatic amine having the general formula $$R_1NH-X$$

in which $R_1$ is an aromatic radical and X is a member of the group consisting of hydrogen, lower alkyl groups and aryl groups, with an aryloxy polyalkylene ether halide of the general formula

in which R is an aromatic hydrocarbon radical containing a nuclear substituent which is one of the group consisting of alkyl, aralkyl, and cycloalkyl radicals, A represents lower alkylene radicals containing more than two carbon atoms, $n$ is an integer less than three and Y is a halogen atom.

12. The process which comprises condensing an aromatic amine of the general formula $$R_1-NH-X$$

in which $R_1$ is an aromatic radical and X is a member of the group consisting of hydrogen, lower alkyl groups and aryl groups, with an aryloxy polyalkylene ether halide of the general formula

in which R is an aromatic hydrocarbon radical containing a nuclear substituent which is one of the group consisting of alkyl, aralkyl and cycloalkyl radicals, A represents lower alkylene radicals containing more than two carbon atoms, $n$ is an integer less than three and Y is a halogen atom.

13. An aromatic amine having the general formula

in which R is an aryloxy polyalkylene ether radical in which the alkylene groups are selected from the lower members of the series, $R_1$ is an aromatic hydrocarbon radical and X is a member of the group consisting of hydrogen, lower alkyl radicals and aryl radicals.

14. An aromatic amine having the general formula

in which R is an aryloxy polyethylene ether radical, $R_1$ is an aromatic hydrocarbon radical and X is a member of the group consisting of hydrogen, lower alkyl radicals and aryl radicals.

15. An aromatic amine having the general formula

in which R is an aryloxy triethylene diether radical, $R_1$ is an aromatic hydrocarbon radical and X is a member of the group consisting of hydrogen, lower alkyl radicals and aryl radicals.

HERMAN A. BRUSON.